United States Patent
Dressendofer et al.

(10) Patent No.: US 9,233,312 B1
(45) Date of Patent: Jan. 12, 2016

(54) ANIMATED DANCING DOLL AND INSTRUCTIONAL METHOD THEREWITH

(71) Applicants: Mary Dressendofer, Hampton, NJ (US); Catherine Vigliotti, Roselle Park, NJ (US)

(72) Inventors: Mary Dressendofer, Hampton, NJ (US); Catherine Vigliotti, Roselle Park, NJ (US)

( * ) Notice: Subject to any disclaimer, the term of this patent is extended or adjusted under 35 U.S.C. 154(b) by 0 days.

(21) Appl. No.: 14/485,226

(22) Filed: Sep. 12, 2014

Related U.S. Application Data

(60) Provisional application No. 61/876,808, filed on Sep. 12, 2013.

(51) Int. Cl.
*A63H 3/00* (2006.01)
*A63H 3/20* (2006.01)
*A63H 29/22* (2006.01)
*G09B 19/00* (2006.01)

(52) U.S. Cl.
CPC .............. *A63H 3/20* (2013.01); *A63H 29/22* (2013.01); *G09B 19/0015* (2013.01)

(58) Field of Classification Search
CPC ............. A63H 3/28; A63H 3/20; A63H 3/48; A63H 11/18; A63H 2200/00
See application file for complete search history.

(56) References Cited

U.S. PATENT DOCUMENTS

| | | | | |
|---|---|---|---|---|
| 3,597,878 | A * | 8/1971 | Iwasaki et al. | 446/355 |
| 3,611,625 | A * | 10/1971 | Sloop et al. | 446/354 |
| 3,700,384 | A * | 10/1972 | Gardel et al. | 446/266 |
| 3,977,122 | A * | 8/1976 | Meyer et al. | 446/268 |
| 4,040,206 | A * | 8/1977 | Kimura | 446/352 |
| 4,182,076 | A * | 1/1980 | Gay et al. | 446/353 |
| 4,889,027 | A * | 12/1989 | Yokoi | 84/635 |
| 5,176,560 | A * | 1/1993 | Wetherell et al. | 446/175 |
| 5,403,223 | A * | 4/1995 | Gaulkin et al. | 446/219 |
| 5,911,617 | A * | 6/1999 | Chou | 446/353 |
| 6,126,508 | A * | 10/2000 | Chou | 446/358 |
| 6,375,536 | B1 * | 4/2002 | Yang | 446/353 |
| 6,500,043 | B1 * | 12/2002 | Fong | 446/330 |
| 6,524,158 | B1 * | 2/2003 | Fong | 446/330 |
| 6,863,587 | B1 * | 3/2005 | Bennett | 446/297 |
| 2011/0117811 | A1 * | 5/2011 | Cytrynowicz | 446/390 |

* cited by examiner

*Primary Examiner* — Michael Dennis
*Assistant Examiner* — Urszula M Cegielnik
(74) *Attorney, Agent, or Firm* — Kintner IP, LLC; Mary Frances Ludwig

(57) ABSTRACT

A doll is provided which performs dance motions and may be used as an instructional aide. In a novel instructional method, a dancer is instructed to perform dance motions by observing and repeating the sequence of motions performed by the doll. Dance motions, such as the plié, are performed by the doll in a fluent, life-like manner.

9 Claims, 8 Drawing Sheets

ANIMATED DANCING DOLL AND INSTRUCTIONAL METHOD THEREWITH

CROSS REFERENCE TO RELATED APPLICATION

This application claims the filing benefit under 35 U.S.C. §119(e) of U.S. Provisional Application No. 61/876,808, filed 12 Sep. 2013, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

TECHNICAL FIELD

The present invention pertains generally to toys, and more particularly to an animated dancing doll and method of instruction utilizing the same.

BACKGROUND OF THE INVENTION

Dancing dolls are well known in the art. Many dolls exist which mimic movements of a ballet dancer, however most simply rotate about an axis through one foot or leg. The motions of other common dancing dolls are frequently jerky and would not be useful in training a dancer to perform a smooth series of motions. A dancing doll which can execute specific dance motions in a manner so precise that it may be used for instructing dancers to learn those moves does not exist in the art.

BRIEF SUMMARY OF THE INVENTION

The present invention is directed to doll which performs dance motions as an instructional aide and a method of dance instruction therewith. The doll includes a torso, a pair of limbs, each of which are pivotally mounted to the torso, an electric motor, and a drive mechanism having multiple elements. The first element of the drive mechanism is mounted on the electric motor and the final element is engaged with one of the limbs, for rotating that limb with respect to the torso.

In an embodiment, an intermediate element of the drive mechanism is engaged with the other of the pair of limbs, for rotating the other of the limbs with respect to the torso, whereby the rotation of each of the pair of limbs is coordinated. The coordinated motion allows the motions of the doll to have a smooth and lifelike appearance.

In an embodiment, a sequence of motions performed by the doll is a plié.

In an embodiment, the doll performs dance motions while free-standing. In another embodiment, the doll is in contact with a ballet bane for support while performing dance motions.

In an embodiment, a second pair of limbs is manually positionable in at least two dimensions.

In an embodiment, the doll includes a music box which plays audible cues corresponding to a sequence of dance motions.

A method is provided for instructing a dancer to perform dance motions, wherein the doll is used as an instructional aide.

Other embodiments, in addition to the embodiments enumerated above, will become apparent from the following detailed description, taken in conjunction with the accompanying drawings, which illustrate, by way of example, the principles of the doll and method of use.

LIST OF DRAWING REFERENCE NUMERALS

20 doll
   22 torso
   24a & 24b limbs
      24u upper members
      24l lower members
      25 knee joints
   26 electric motor
   28 feet
   30 drive mechanism
      32 first element
      34 final element
      36 intermediate element
   40 circuit
      42 microprocessor
      44 circuit activation element
      46 music box
   80 tutu
   82 shoes
   84 tiara
500 ballet barre
600 base

DETAILED DESCRIPTION OF THE INVENTION

Figure 1:
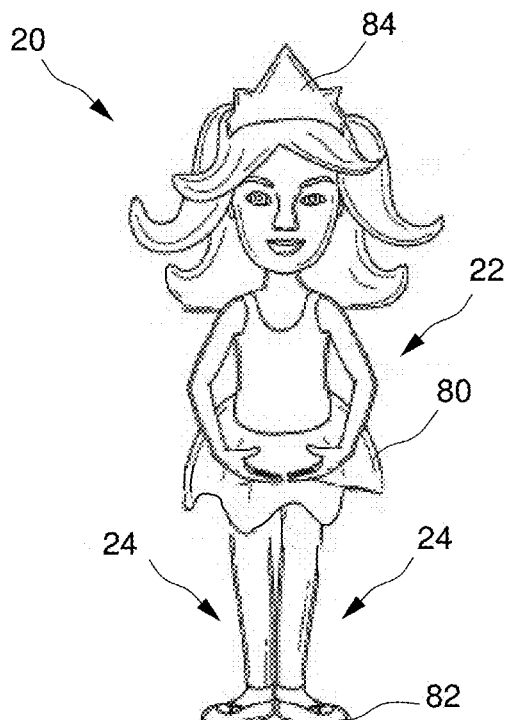
FIG. 1 is a front elevation view of an animated ballerina doll in first position.

Referring initially to FIG. 1, there is illustrated a front elevation view of an animated dancing doll in first position, the doll generally designated as 20. First position refers to a position of the feet in ballet wherein the heels are together with toes pointing outward and soles of the feet on the floor. Doll 20 includes a torso 22, multiple limbs 24 (referred to as pairs 24a and 24b, two arms and two legs herein), an electric motor 26, and an internal drive mechanism 30 (refer to FIGS. 3-5).

Figure 2:
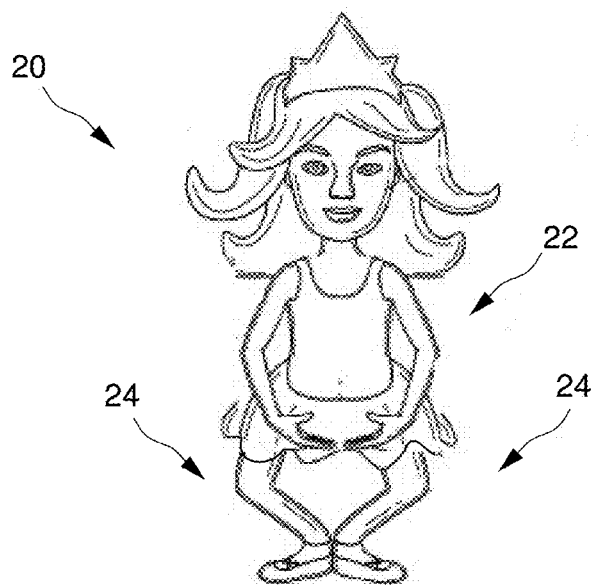
FIG. 2 is a front elevation view of the doll performing a first position plié.

Doll 20 performs various ballet motions such as first position (FIG. 1) and first position plié as in FIG. 2. Doll 20 functions both as a toy to entertain children and an instructional device for reinforcing skills taught previously or simultaneously by an instructor in a ballet lesson. In the depicted embodiment, doll 20 enforces, for example, that a plié motion is performed slowly and smoothly without jerky motions.

In the depicted embodiment, doll 20 has a height of approximately 30-45 centimeters (12-18 inches); however, alternate heights may be substituted. Torso 22 and limbs 24a & 24b of doll 20 may be rubberized, plush, or of other composition well known in the art. Doll 20 is preferably dressed in a ballet outfit, which for example includes tutu 80, ballet shoes 82, and tiara 84, but alternative outfits may be substituted.

Figures 3, 5:
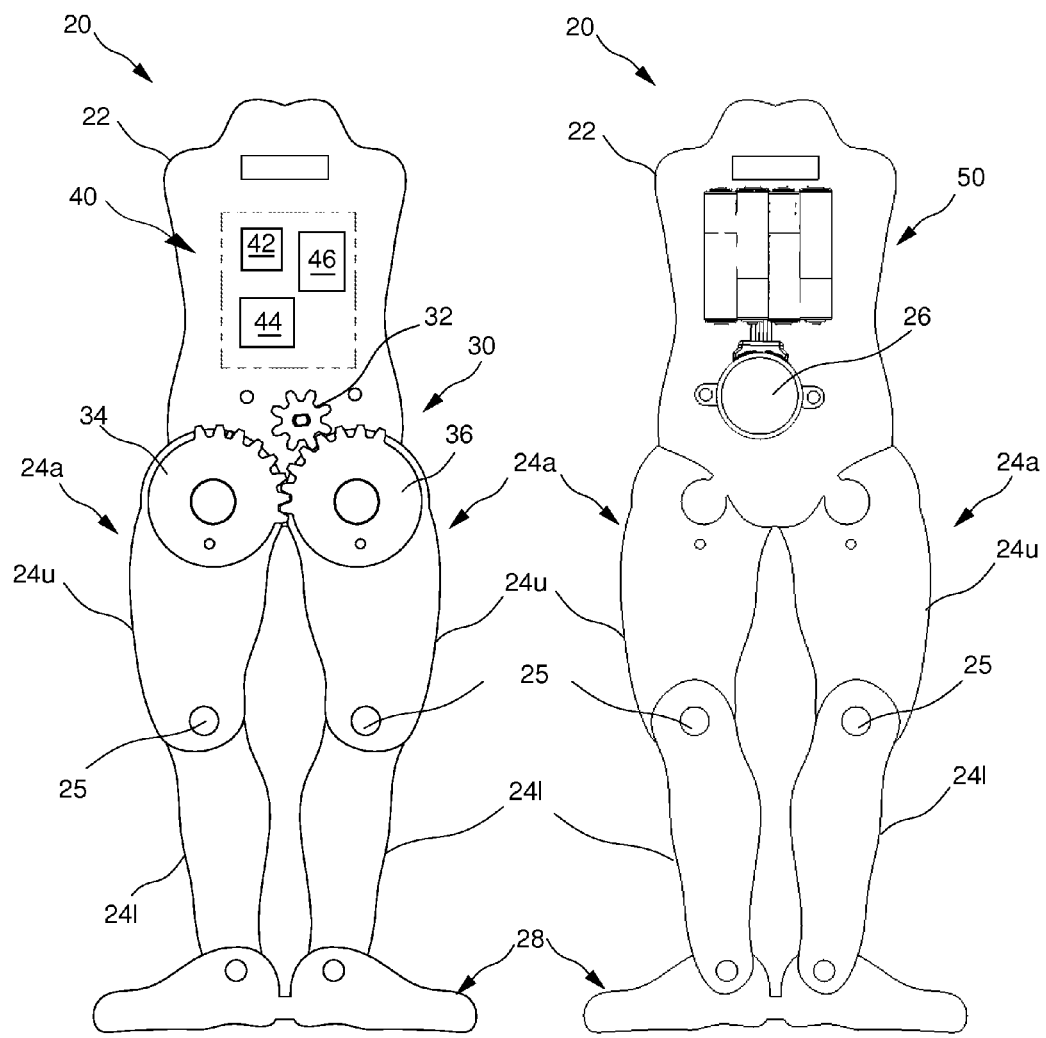
FIG. 3 is a front elevation view of an internal animation mechanism of the doll in first position.
FIG. 5 is a rear elevation view of the internal animation mechanism of the doll in first position.
Figure 4:
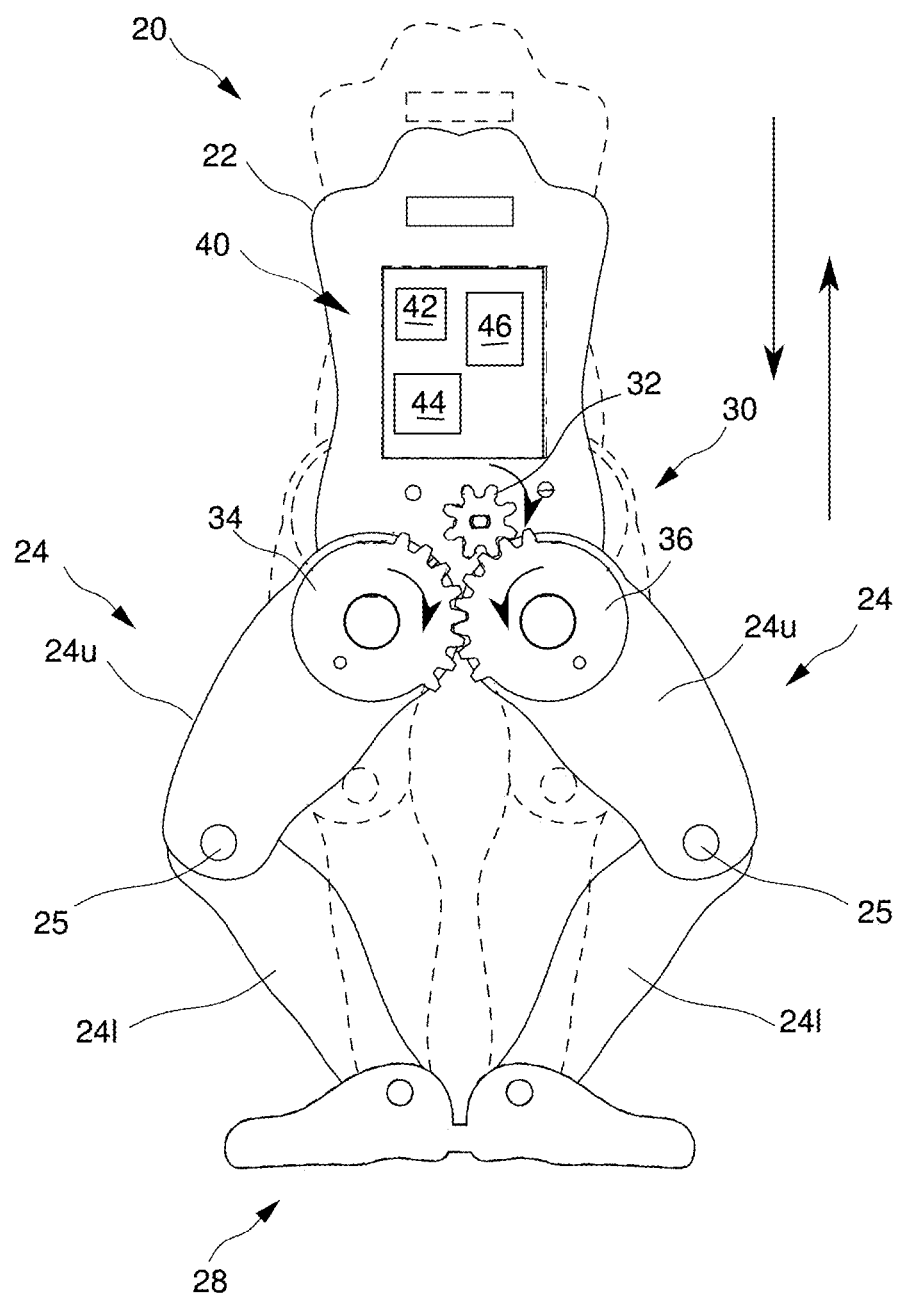
FIG. 4 is a front elevation view of the internal animation mechanism of the doll performing a first position plié.

FIGS. 3 and 4 are front elevation views of an internal animation mechanism of doll 20 in first position and performing a first position plié, respectively. FIG. 5 is a rear elevation view of the internal animation mechanism of the doll in first position. The animation mechanism includes electric motor 26 and drive mechanism 30. Drive mechanism 30 has a first element 32, shown herein as a pinion or spur gear, and a final element 34, shown herein as a gear segment. Drive mechanism 30 may include a number of intermediate elements. Elements of drive mechanism 30 are not limited to the embodiments shown, and may for example take the form of worm gears, reduction gears, connective rods, and other components of mechanical drives well known in the art.

Electric motor 26 may take the form of a DC stepper motor (as shown), piezoelectric motor, or other compact motor. Electric motor 26 is shown housed in torso 22, but may be located elsewhere on doll 20. Electric motor 26 is powered by batteries 50, which likewise may be used to power circuit 40.

Doll 20 includes a pair of limbs 24a (legs in the shown embodiment) which are each pivotally mounted to torso 22. Pivotally mounted means that limbs 24a may rotate with respect to torso 22 about at least one dimensional axis (X, Y, or Z). First element 32 is mounted on electric motor 26 and final element 34 is engaged with (by direct mounting in the shown case) one of limbs 24a. When electric motor 26 is powered on, drive mechanism 30 is set in motion. First element 32 rotates and that rotation is transmitted by the elements of drive mechanism 30 causing final element 34 to rotate, whereby one of limbs 24a rotates with respect to torso 22. In the shown embodiment, final element 34 is mounted on the right leg of doll 20. Right leg rotates with respect to torso 22 about the Z-axis (axis perpendicular to the plane of FIG. 3).

Drive mechanism 30 has an intermediate element 36 engaged with the other of limbs 24a. When drive mechanism 30 is set in motion, intermediate element 36 rotates causing the other of limbs 24a to rotate with respect to torso 22. By virtue of their direct connection to the same drive mechanism, the rotation of each of limbs 24a is coordinated. Features of the elements of drive mechanism 30, such as gear ratios, length of connecting components, and the like, may be specified for a desired application to precisely control the coordination of limbs 24a. The coordination of the movement of limbs 24a is preferred to achieve the smooth, fluent motions desired for doll 20 to be useful as an instructional aide.

In the embodiment shown, intermediate element 36 is directly engaged with final element 34. However, a number of additional intermediate elements may be placed between intermediate element 36 and final element 34. Additional elements may also be used to permit rotation of limbs 24a about other axes.

Figure 6:
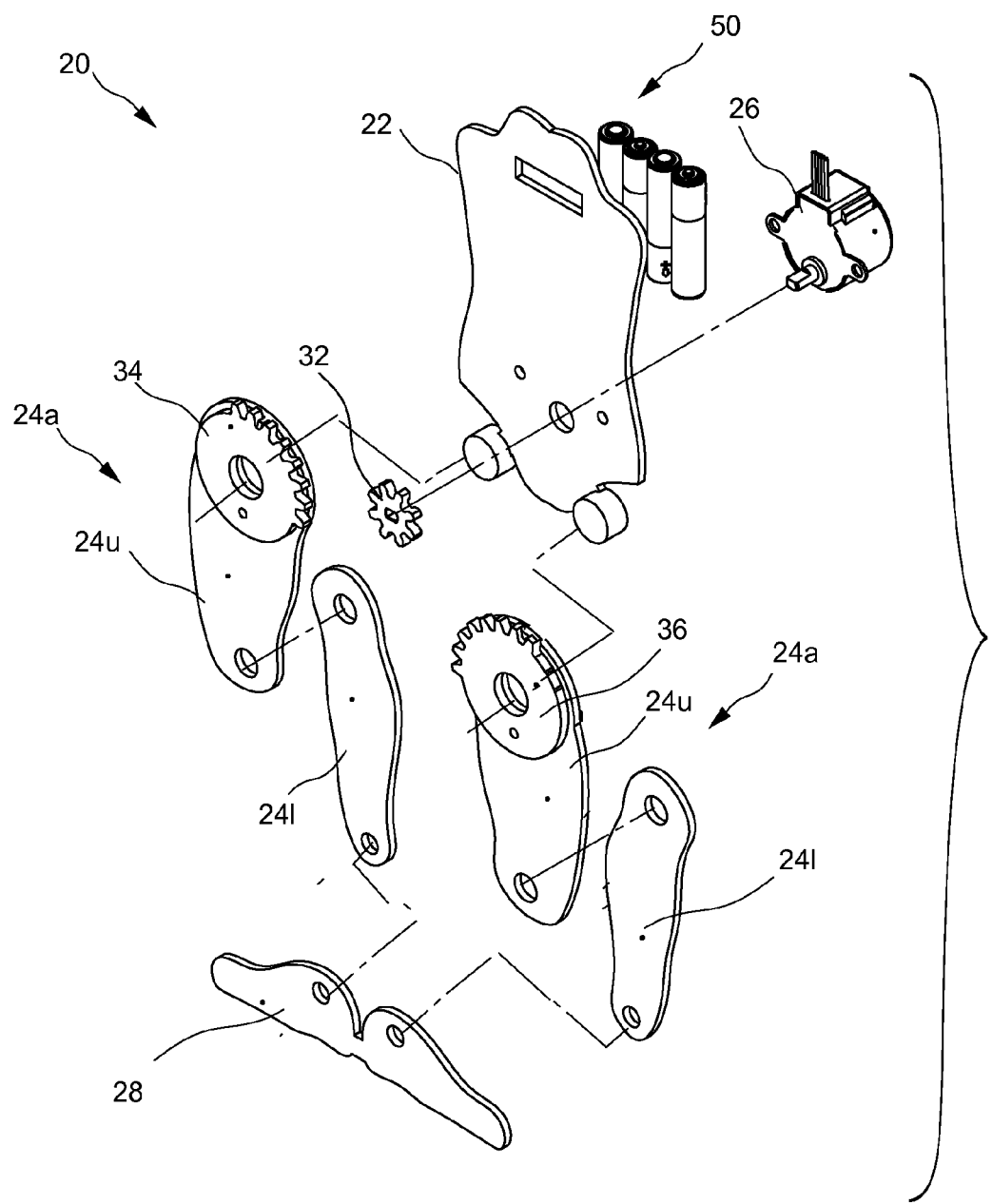
FIG. 6 is an exploded perspective view of the internal animation mechanism.

FIG. 6 is an exploded perspective view of the internal animation mechanism. In the shown embodiment, limbs 24a are each comprised of an upper member 24u (or thigh) and a lower member 24l (or calf). Upper member 24u and lower member 24l of each limb 24a are connected to form knee joints 25. Doll 20 has feet 28 which are shown joined at the heel for stability. In first position, feet 28 point away from each other at a predetermined angle, for example, 180 degrees as shown in FIGS. 1-2. However, alternate angles may be substituted.

Figure 7:
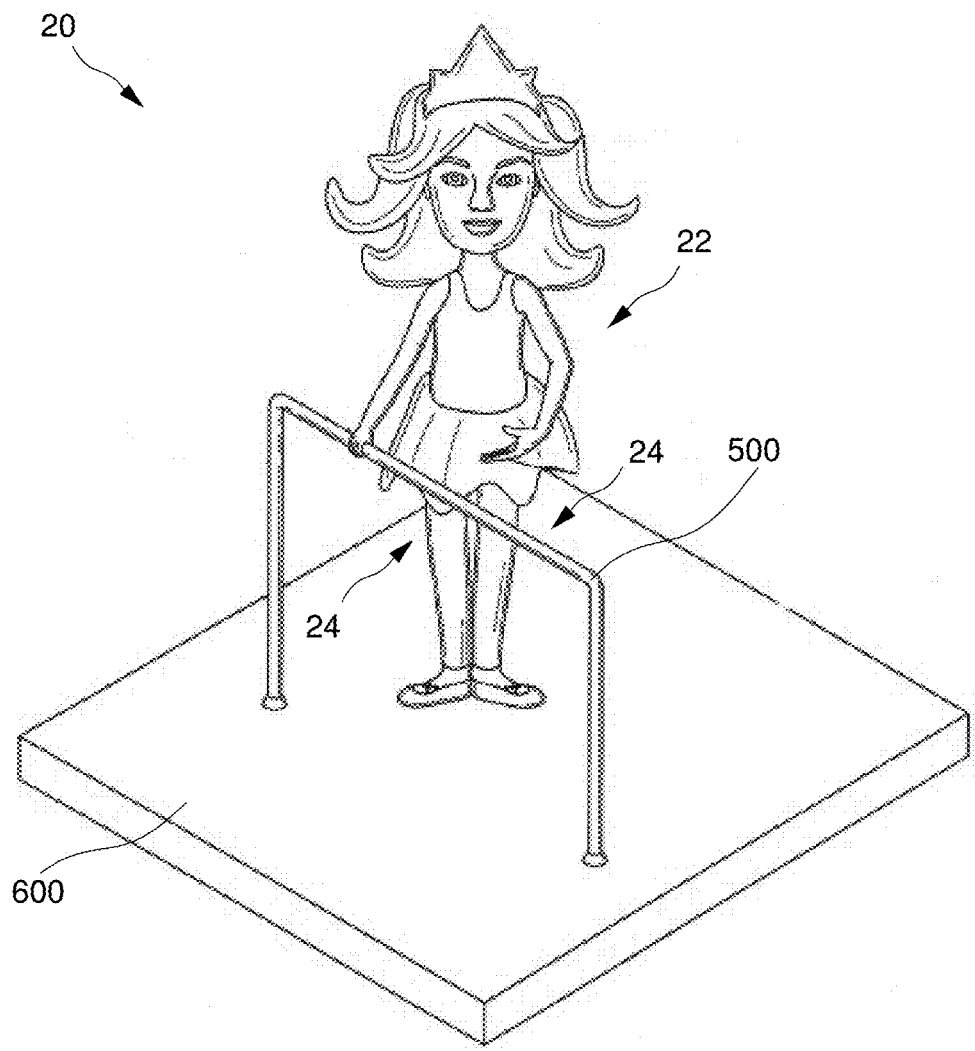
FIG. 7 is a front elevation view of another embodiment of the doll in first position.
Figure 8:
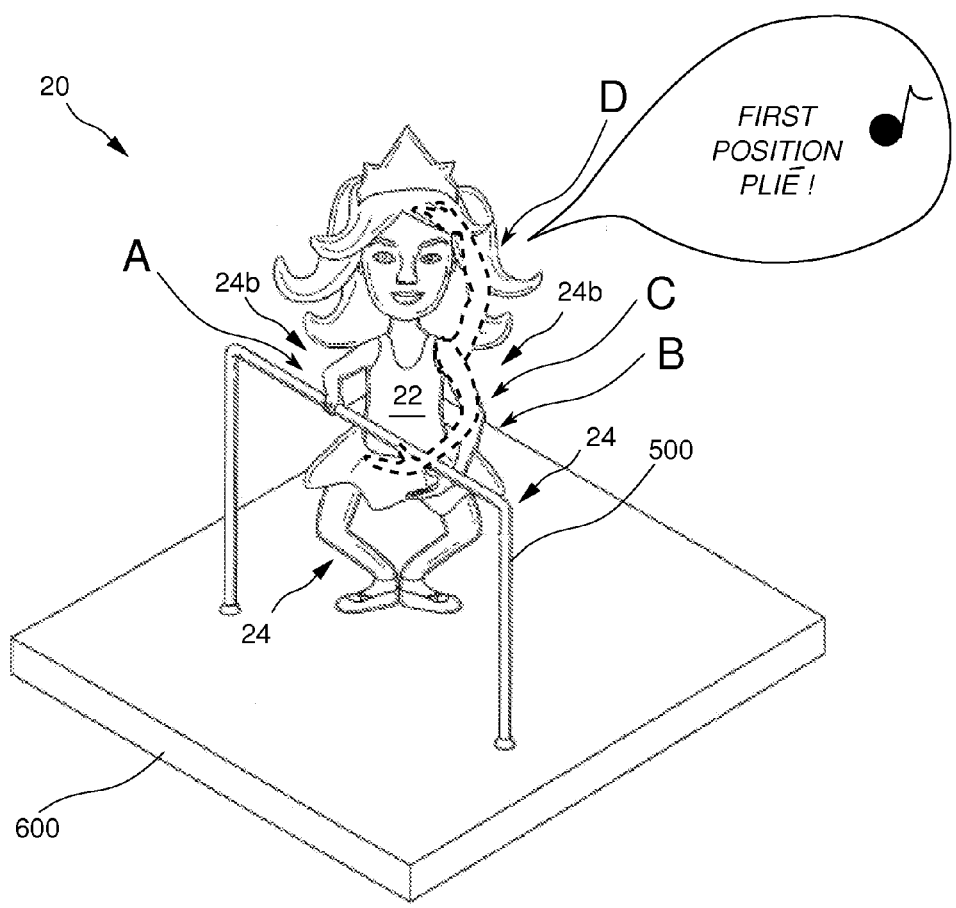
FIG. 8 is a front elevation view of another embodiment of the doll performing a first position plié.

In first position and while performing a ballet exercise, feet 28 are in full contact with a provided base 600 or similar surface upon which doll 20 is free standing. FIGS. 7 and 8 are front elevation views of another embodiment of doll 20 in first position and performing a performing a first position plié, respectively. Doll 20 cooperates with a ballet barre 500. Doll 20 further includes an arm manually positionable to contact or grasp ballet barre 500 for support. One or two arms may be positioned to contact ballet barre 500. Ballet bane 500 allows doll 20 to remain upright while performing ballet exercises that require one or both heels or feet to be raised off the floor.

Figure 9:
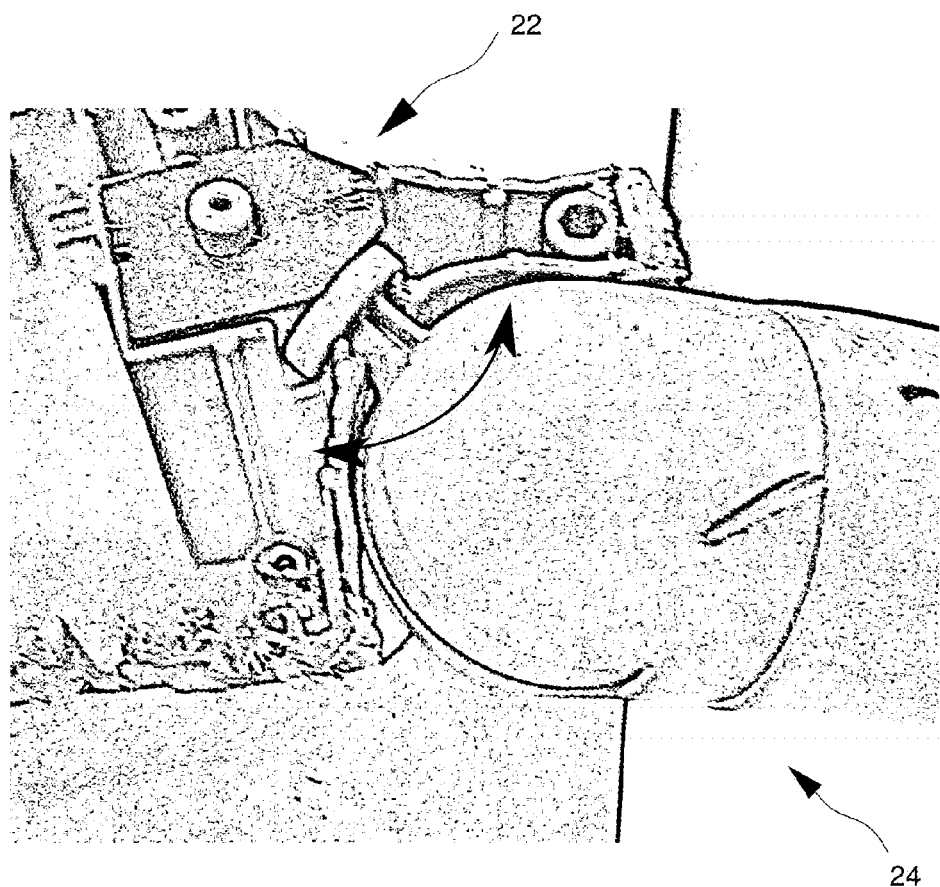
FIG. 9 is a cross-sectional view of a first prior art mechanism for manually positioning a limb of the doll; and, FIG. 10 is a plan view of a second prior art mechanism for manually positioning the limb.
Figure 10:
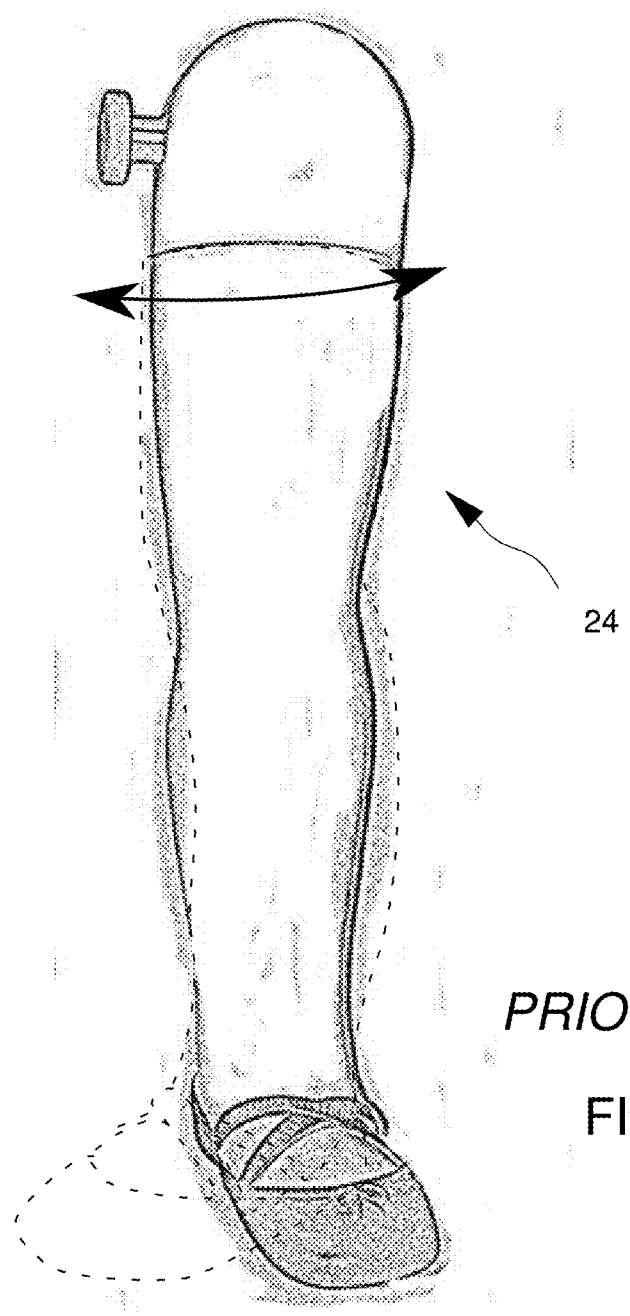

In an embodiment, doll 20 includes a second pair of limbs 24b (arms in the shown embodiment) which are pivotally mounted to torso 22. Limbs 24b are manually positionable in at least two dimensions with respect to torso 22. FIGS. 9 and 10 are views of the rotational mechanisms used to position limbs 24b. The mechanism of FIG. 9 permits rotation of limbs 24b in one dimension, while the mechanism of FIG. 10 permits rotation in a second dimension. FIGS. 9 and 10 are given by way of example, as many such mechanisms are well known in the art.

When performing a first position plié, as shown in FIG. 8, limbs 24b are manually positionable in a number of different positions. For example, position A shows one of limbs 24b in contact with ballet barre 500. Positions B, C, and D show the other of limbs 24b positioned, respectively, at the side of doll 20, in front of torso 22, and overhead of doll 20.

Referring again to FIGS. 3-6, doll 20 further includes an electrical circuit 40 electrically connected to electric motor 26. Circuit 40 provides a sequence of signals to electric motor 26, thereby generating a sequence of motions of limbs 24. The sequence of signals may include a series of voltages or currents of predetermined amplitude, polarity, or duration as required to operate electric motor 26 for generating a desired sequence of motions.

The sequence of motions is preferentially a ballet exercise, such as a plié (with or without an accompanying "port de bras" hand movement), grande plié, relevé, tendu, or the like. When performing a demi plié, as illustrated, the sequence of motions comprises (starting from first position) bending at the knees to a half bend and rising back up to first position (refer to FIG. 4). The knee joints 25 of doll 20 are bent by rotating limbs 24 while maintaining feet 28 in contact with base 600 or a comparable surface.

In another embodiment, circuit 40 includes a microprocessor 42 programmable with a set of instructions for generating the sequence of signals. Circuit 40 includes a circuit activation element 44 which, when activated, calls the set of instructions. Circuit activation element 44 may be a push button switch, voice-activated switch, or similar. Doll 20 may thereby be remotely activated by a dancer to perform a requested exercise. By programming multiple sets of instructions numerous ballet exercises can be stored on the microprocessor and called by different voice commands.

In another embodiment, doll 20 includes a music box 46 which plays music and spoken instructions while doll 20 performs a sequence of motions. For example, doll 20 greets the dancer, sings the names of a series of ballet motions while performing them, and then says farewell to the dancer. An example of such spoken instruction is given below:

(Spoken) "Come dance with me now! Ready, everyone?
(Sung to music) Plié, relevé, plié, relevé,
Plié, straight knees, tendu, coupé,
Pas de bourrée, pas de bourrée,
Step and curtsy, that's our dance for today!" (End music)
(Spoken) Great job, everybody!

In another embodiment, music box 46 plays additional phrases such as:

"Hi, I'm Princess Plié. What's your name?" or
"Would you like to dance with me?".

Further provided is a method of instructing a dancer using doll 20 as an instructional aide. While the embodiments shown herein refer to ballet, the method may be used for instruction in other forms of dance such as tap or jazz.

A method of instructing a dancer to perform dance motions includes: (refer to FIGS. 1-10)
(a) providing a doll 20 including:
  (i) a torso 22;
  (ii) a pair of limbs 24, each of limbs 24 pivotally mounted to torso 22;
  (iii) an electric motor 26;
  (iv) a drive mechanism 30 having a first element 32 mounted on electric motor 26 and a final element 34 engaged with one of limbs 24, for rotating one of limbs 24 with respect to said torso 22;
  (v) a circuit 40 electrically connected to electric motor 26;
  (vi) circuit 40 providing a sequence of signals to electric motor 26, thereby generating a sequence of motions of limbs 24; and,
  (vii) the sequence of motions being a dance exercise;
(b) placing doll 20 in view of the dancer;
(c) activating circuit 40 so that the sequence of motions is executed by doll 20; and,
(d) instructing the dancer to imitate the sequence of motions.

The method further including, in (a)(vii), the dance exercise being a plié or a series of stretches and bends.

The method further including:
in (a), doll 20 further including,
  circuit 40 having a microprocessor programmable with a set of instructions;
  a circuit activation element 44 for calling the instructions; and,
  when circuit activation element 44 is activated, the instructions being called, the instructions causing circuit 40 to generate the sequence of signals; and,
in (g), activating circuit 40 by activating circuit activation element 44.

The method further including, in (a), circuit activation element 44 being voice activated; and, in (c), the dancer speaking to activate circuit 40.

The method further including:
in (a), doll 20 further including,
  a music box 46 electrically connected to circuit 40;
  music box 46 playing audible cues corresponding to the sequence of motions when circuit 40 is activated;
in (g), music box 46 playing the audible cues; and,
in (h), instructing the dancer to imitate the sequence of motions when cued by the audible cues.

The embodiments of the doll and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the doll and method should be construed as limiting the invention to a particular embodiment or combination of embodiments. The scope of the invention is defined by the appended claims.

We claim:

1. A doll which performs dance motions as an instructional aide, said doll comprising:
a torso;
a pair of limbs, each of said limbs pivotally mounted to said torso and having a bendable knee joint;
a pair of feet;
an electric motor;
a drive mechanism having a first element mounted on said electric motor, a final element engaged with one of said limbs, and an intermediate element engaged with the other of said limbs so that when said electric motor is powered said drive mechanism transmits rotational motion from said electric motor to said first element, said final element, and said intermediate element, thereby pivoting said limbs with respect to said torso in a coordinated manner;
said final element and said intermediate element pivoting said limbs in opposite directions with respect to said torso; and,
when said limbs are pivoted said knee joints bend thereby changing the distance between said knee joints and the distance between said torso and said feet.

2. The doll according to claim 1, further including:
said intermediate element being directly engaged with said final element.

3. The doll according to claim 1, further including:
a circuit electrically connected to said electric motor; and,
said circuit providing a sequence of signals to said electric motor, thereby generating a sequence of motions of said limbs.

4. The doll according to claim 3, further including:
each of said feet having a heel; and,
said sequence of motions being a ballet exercise including starting from first position wherein said heels are in contact and said feet are angled away from each other, at least partially bending said knee joints thereby increasing the distance between said knee joints and bringing said torso nearer to said feet, and returning to first position.

5. The doll according to claim 4, wherein:
said ballet exercise is a plié.

6. The doll according to claim 4, further including:
said sequence of motions being executed while the doll is free-standing.

7. The doll according to claim 3, further including:
said circuit having a microprocessor programmable with a set of instructions;
a circuit activation element for calling said instructions; and,
when said circuit activation element is activated, said instructions being called, said instructions causing said circuit to generate said sequence of signals.

8. The doll according to claim 1, further including:
a second pair of limbs, each of said second pair of limbs pivotally mounted to said torso, and manually positionable in at least two dimensions with respect thereto.

9. The doll according to claim 8, further including:
at least one of said second pair of limbs being a manually positionable arm;
each of said feet having a heel;
a circuit electrically connected to said electric motor;

said circuit providing a sequence of signals to said electric motor, thereby generating a sequence of motions of said limbs;

said sequence of motions being a ballet exercise including starting from first position wherein said heels are in contact and said feet are angled away from each other, at least partially bending said knee joints thereby increasing the distance between said knee joints and bringing said torso nearer to said feet, and returning to first position;

a ballet barre; and, said arm contacting said ballet bane for support when demonstrating said ballet exercise.

* * * * *

UNITED STATES PATENT AND TRADEMARK OFFICE
CERTIFICATE OF CORRECTION

| | | |
|---|---|---|
| PATENT NO. | : 9,233,312 B1 | Page 1 of 1 |
| APPLICATION NO. | : 14/485226 | |
| DATED | : January 12, 2016 | |
| INVENTOR(S) | : Mary Dressendofer and Catherine Vigliotti | |

It is certified that error appears in the above-identified patent and that said Letters Patent is hereby corrected as shown below:

In the specification, column 1, line 61; column 4, line 19; and in the claims, column 7, claim 9, line 12, for "bane", each occurrence, should read --barre--.

Signed and Sealed this
Eighth Day of March, 2016

Michelle K. Lee
*Director of the United States Patent and Trademark Office*